United States Patent
Gong et al.

(10) Patent No.: US 11,773,468 B2
(45) Date of Patent: Oct. 3, 2023

(54) AL—MG—SI ALLOYS FOR APPLICATIONS SUCH AS ADDITIVE MANUFACTURING

(71) Applicant: QUESTEK INNOVATIONS LLC, Evanston, IL (US)

(72) Inventors: Jiadong Gong, Evanston, IL (US); Gregory B. Olson, Riverwoods, IL (US); David R. Snyder, Warrenville, IL (US)

(73) Assignee: QUESTEK INNOVATIONS LLC, Evanston, IL (US)

(*) Notice: Subject to any disclaimer, the term of this patent is extended or adjusted under 35 U.S.C. 154(b) by 0 days.

(21) Appl. No.: 16/767,537

(22) PCT Filed: Nov. 28, 2018

(86) PCT No.: PCT/US2018/062779
§ 371 (c)(1),
(2) Date: May 27, 2020

(87) PCT Pub. No.: WO2019/194869
PCT Pub. Date: Oct. 10, 2019

(65) Prior Publication Data
US 2020/0385845 A1 Dec. 10, 2020

Related U.S. Application Data

(60) Provisional application No. 62/591,515, filed on Nov. 28, 2017.

(51) Int. Cl.
*C22C 1/04* (2023.01)
*B33Y 70/00* (2020.01)
(Continued)

(52) U.S. Cl.
CPC .............. *C22C 1/0416* (2013.01); *B22F 3/24* (2013.01); *B22F 9/08* (2013.01); *B22F 10/64* (2021.01);
(Continued)

(58) Field of Classification Search
CPC ....... B22F 9/082–2009/0896; B22F 2301/052; C22F 1/047; C22C 21/08
See application file for complete search history.

(56) References Cited

U.S. PATENT DOCUMENTS

| | | | |
|---|---|---|---|
| 4,668,290 | A | 3/1987 | Wang et al. |
| 4,711,762 | A | 12/1987 | Vernam et al. |

(Continued)

FOREIGN PATENT DOCUMENTS

| | | |
|---|---|---|
| CN | 107234240 A | 10/2017 |
| EP | 0654320 A1 | 5/1995 |

(Continued)

OTHER PUBLICATIONS

JPH0776701A English language translation (Year: 1995).*
(Continued)

*Primary Examiner* — Sally A Merkling
*Assistant Examiner* — Sean P. O'Keefe
(74) *Attorney, Agent, or Firm* — Michael Best & Friedrich LLP

(57) ABSTRACT

Materials, methods and techniques disclosed and contemplated herein relate to aluminum alloys. Generally, multicomponent aluminum alloys include aluminum, magnesium, silicon, and, in some instances, iron and/or manganese, and include Mg2Si phase precipitates. Example multicomponent aluminum alloys disclosed and contemplated herein are particularly suited for use in additive manufacturing operations.

5 Claims, 6 Drawing Sheets

(51) Int. Cl.

| | |
|---|---|
| *C22C 21/00* | (2006.01) |
| *B33Y 40/10* | (2020.01) |
| *B22F 3/24* | (2006.01) |
| *C22C 21/08* | (2006.01) |
| *C22F 1/047* | (2006.01) |
| *B22F 10/64* | (2021.01) |
| *B33Y 10/00* | (2015.01) |
| *B22F 10/34* | (2021.01) |
| *C21D 9/00* | (2006.01) |
| *B22F 9/08* | (2006.01) |
| *B22F 10/25* | (2021.01) |
| *B22F 10/28* | (2021.01) |
| *B22F 10/36* | (2021.01) |
| *B22F 10/366* | (2021.01) |
| *B22F 10/38* | (2021.01) |

(52) U.S. Cl.
CPC ............... *B33Y 40/10* (2020.01); *B33Y 70/00* (2014.12); *C21D 9/00* (2013.01); *C22C 21/00* (2013.01); *C22C 21/08* (2013.01); *C22F 1/047* (2013.01); *B22F 10/25* (2021.01); *B22F 10/28* (2021.01); *B22F 10/34* (2021.01); *B22F 10/36* (2021.01); *B22F 10/366* (2021.01); *B22F 10/38* (2021.01); *B22F 2003/248* (2013.01); *B22F 2301/052* (2013.01); *B22F 2998/10* (2013.01); *B33Y 10/00* (2014.12)

(56) References Cited

U.S. PATENT DOCUMENTS

| | | | |
|---|---|---|---|
| 4,861,391 | A | 8/1989 | Rioja et al. |
| 4,874,440 | A | 10/1989 | Sawtell et al. |
| 2004/0089382 | A1 | 5/2004 | Senkov et al. |
| 2006/0013719 | A1 | 1/2006 | Ichikawa et al. |
| 2009/0263266 | A1 | 10/2009 | Pandey |
| 2010/0143177 | A1 | 6/2010 | Pandey |
| 2010/0226817 | A1 | 9/2010 | Pandey |
| 2011/0044843 | A1 | 2/2011 | Misra et al. |
| 2013/0312877 | A1 | 11/2013 | Chakrabarti et al. |
| 2014/0230974 | A1 | 8/2014 | Lin et al. |
| 2014/0271322 | A1 | 9/2014 | Godfrey et al. |
| 2016/0222493 | A1 | 8/2016 | Saikawa et al. |
| 2016/0228950 | A1 | 8/2016 | Bodily et al. |
| 2017/0121794 | A1* | 5/2017 | Lenczowski ............... C22C 1/00 |
| 2017/0247782 | A1* | 8/2017 | Matsumoto ............. C22C 21/02 |
| 2017/0314109 | A1 | 11/2017 | McCloskey |
| 2018/0010216 | A1 | 1/2018 | Vo et al. |
| 2018/0126457 | A1* | 5/2018 | Hou ....................... B33Y 70/00 |

FOREIGN PATENT DOCUMENTS

| | | | |
|---|---|---|---|
| EP | 2110450 | A1 | 10/2009 |
| EP | 2112240 | A1 | 10/2009 |
| EP | 3034639 | A1 | 6/2016 |
| EP | 0165620 | A1 | 5/2017 |
| JP | H0776701 | A | 3/1995 |
| JP | 2003277896 | A | 10/2003 |
| JP | 2005528530 | A | 9/2005 |
| JP | 2011-021218 | A | 2/2011 |
| JP | 2011-510174 | A | 2/2011 |
| JP | 2015-071823 | A | 4/2015 |
| JP | 2017066432 | A | 4/2017 |
| JP | 2017-155291 | A | 9/2017 |
| WO | 2014/071135 | A1 | 5/2014 |
| WO | 2014/144630 | A1 | 9/2014 |
| WO | 2014/196987 | A2 | 12/2014 |
| WO | 2016/199564 | A1 | 12/2016 |
| WO | 2017/041006 | A1 | 3/2017 |

OTHER PUBLICATIONS

European Patent Office Extended Search Report for Application No. 18913552.8 dated Jun. 30, 2021 (15 pages).
Johannesson et al., "Effect of Si additions and heat treatment on the mechanical behaviour of an Al—5Mg casting alloy", International Journal of Cast Metals Research, vol. 17, No. 2, 2004, pp. 94-98.
European Patent Office Extended Search Report for Application No. 18884266.0 dated Aug. 6, 2021 (11 pages).
Bartkowiak et al., "New Developments of Laser Processing Aluminium Alloys via Additive Manufacturing Technique," Physics Procedia, 2011, 12:393-401.
Carpenter Technology, "A Clean Ti: A Gas Atomization Primer," <https://www.carpentertechnology.com/en/alloy-techzone/technical-information/technical-articles/a-clean-ti-a-gas-atomization-primer> webpage available as early as Nov. 13, 2018.
Desmukh et al., "Effect of aging treatments on the kinetics of fatigue crack growth in 7010 aluminum alloy" Materials Science and Engineering, Novembers, 2006 , vol. 435-436, pp. 318-326.
Dietrich et al., "A New Approach for a Flexible Powder Production for Additive Manufacturing," Procedia Manufacturing, 2016, 6: 88-95.
EIGA Systems, "Electrode Induction Melting Inert Gas Atomization Systems for Electrodes up to 150 mm Diameter anc 1000 mm Length," <https://www.ald-vt.com/portfolio/engineering/vacuum-metallurgy/electrode-induction-melting-inert-gas-atomization/> webpage available as early as Nov. 13, 2018.
Erasteel, "Powder Metallurgy—ASP," <https://www.erasteel.com/technologies/powder-metallurgy-asp/> webpage available as early as Nov. 13, 2018.
Fulcher et al., "Comparison of ALSI10MG and AL6061 processed through DMLS," Proceedings of the Solid Freeform Fabrication (SFF) Symposium, 2014, 404-419.
Jones, "Engineering Design Data for Aluminum Alloy 7050-T73651 Plate," Air Force Materials Laboratory, 1973, 37 pages.
Reschetnik et al., "Fatigue crack growth behavior and mechanical properties of additively processed EN AW-7075 aluminium alloy," Procedia Structural Integrity, 2016, 2:3040-3048.
Robinson et al., "The influence of quench sensitivity on residual stresses in aluminum alloys 7010 and 7075" Materials Characterization, Jan. 6, 2012, vol. 65, pp. 73-85.
Roenning et al., "Constitutive Relationships for AlZnMg, AlZnMgCr, and AlZnMgZr Alloys," Metallurgical and Materials Transactions A, Mar. 2001, 32:769-776.
VIGA Systems, "Vacuum Induction Melting Inert Gas Atomization Systems for Charge Weights from 5 up to 2500 kg," <https://www.ald-vt.com/portfolio/engineering/vacuum-metallurgy/vacuum-induction-melting-inert-gas-atomization/> webpage available as early as Nov. 13, 2018.
Yuan et al., "Effect of Zr addition on properties of Al—Mg—Si aluminum alloy used for all aluminum alloy conductor," Materials and Design, 2011, 32(8-9): 4195-4200.
International Preliminary Reporton Patentability for Application No. PCT/US2016/050221 dated Nov. 22, 2016 (7 pages).
International Search Report and Written Opinion for Application No. PCT/US2016/050221 dated Nov. 22, 2016 (12 pages).
International Search Report and Written Opinion for Application No. PCT/US2018/062761 dated Feb. 7, 2019 (15 pages).
International Search Report and Written Opinion for Application No. PCT/US2018/062779 dated Nov. 1, 2019 (15 pages).
Japanese Patent Office Notice of Reasons for Refusal for Application No. 2020-529355 dated Nov. 16, 2022 (7 pages including English translation).
Japanese Patent Office Notice of Reasons for Refusal for Application No. 2020-529360 dated Nov. 16, 2022 (7 pages including English translation).

* cited by examiner

Before EXCO test

AL—MG—SI ALLOYS FOR APPLICATIONS SUCH AS ADDITIVE MANUFACTURING

CROSS-REFERENCE

The present application is a U.S. national stage entry of International Patent Application No. PCT/US2018/062779, filed on Nov. 28, 2018, which claims priority to U.S. provisional patent application No. 62/591,515, filed on Nov. 28, 2017, the disclosures of each of which are hereby incorporated by reference in their entirety.

GOVERNMENT INTEREST

Aspects of the present disclosure were made with government support under contract number N00014-15-C-0158 awarded by the U.S. Office of Naval Research. The government has certain rights in the disclosure.

TECHNICAL FIELD

The present disclosure relates to materials, methods and techniques for manufacturing Al—Mg—Si alloys. Example applications of Al—Mg—Si alloys disclosed and contemplated herein include additive manufacturing processes.

INTRODUCTION

Additive manufacturing, also known as 3-D printing, is a fabrication technique that utilizes successive layer generation to produce an item of manufacture. Typically, additive manufacturing methods use powders, wires, or liquid bases to generate layers under direction of computer-aided design data. Example additive manufacturing processes include stereolithography, selective laser sintering (SLS), direct metal laser sintering (DMLS), electron beam melting (EBM), and laser powder deposition (LPD).

By allowing for net-shape fabrication of highly complex geometries without molds or machining, this process offers the potential to reduce material usage, energy consumption, component cost, and fabrication time. Additive manufacturing allows for rapid component production, one-off production of difficult-to-source parts, and production of parts difficult to produce by conventional means (such as complex geometries that cannot be machined or cast). As a result, additive manufacturing can provide flexibility in part manufacturing to original equipment manufacturers as well as end users acquiring custom or replacement parts.

Today's landscape of aluminum alloys specially tailored to additive manufacturing (AM) processing is severely limited, leaving AM component designers with little flexibility in their designs, particularly for high-temperature aerospace applications, such as gearboxes. Typically used Al—Si alloys (including $AlSi_{10}Mg$) are highly processable through direct metal laser sintering (DMLS) due to their eutectic solidification, which imparts hot tearing resistance during the build process. These alloys, however, are designed with a Si eutectic that remains throughout post-build processing and is detrimental to mechanical performance. Accordingly, improved aluminum alloys, specifically alloys for additive manufacturing processes, are needed.

SUMMARY

Materials, methods and techniques disclosed and contemplated herein relate to aluminum alloys. For example, the aluminum alloys may be aluminum-based alloys. Generally, the aluminum-based alloys include aluminum (Al), magnesium (Mg), silicon (Si), manganese (Mn), and iron (Fe).

In one aspect, an alloy is disclosed. The alloy includes, by weight percentage, 5% to 8% magnesium, 1.5% to 4% silicon, no more than 0.3% manganese, no more than 0.2% iron, and the balance of weight percent comprising aluminum and incidental elements and impurities.

In another aspect, an atomized alloy powder usable in additive manufacturing is disclosed. The atomized alloy powder comprises alloy particles. The alloy particles include, by weight percentage, 5% to 8% magnesium, 1.5% to 4% silicon, no more than 0.3% manganese, no more than 0.2% iron, and the balance of weight percent comprising aluminum and incidental elements and impurities.

In another aspect, a method of using an atomized alloy powder in additive manufacturing is disclosed. The method includes receiving the atomized alloy powder comprising alloy particles, conducting additive manufacturing with the atomized alloy powder to generate a manufactured article, and aging the manufactured article in a heated container for a period of time. The atomized alloy powder comprises alloy particles. The alloy particles include, by weight percentage, 5% to 8% magnesium, 1.5% to 4% silicon, no more than 0.3% manganese, no more than 0.2% iron, and the balance of weight percent comprising aluminum and incidental elements and impurities.

There is no specific requirement that a material, technique or method relating to aluminum alloys include all of the details characterized herein, in order to obtain some benefit according to the present disclosure. Thus, the specific examples characterized herein are meant to be exemplary applications of the techniques described, and alternatives are possible.

DETAILED DESCRIPTION

Figure 1:
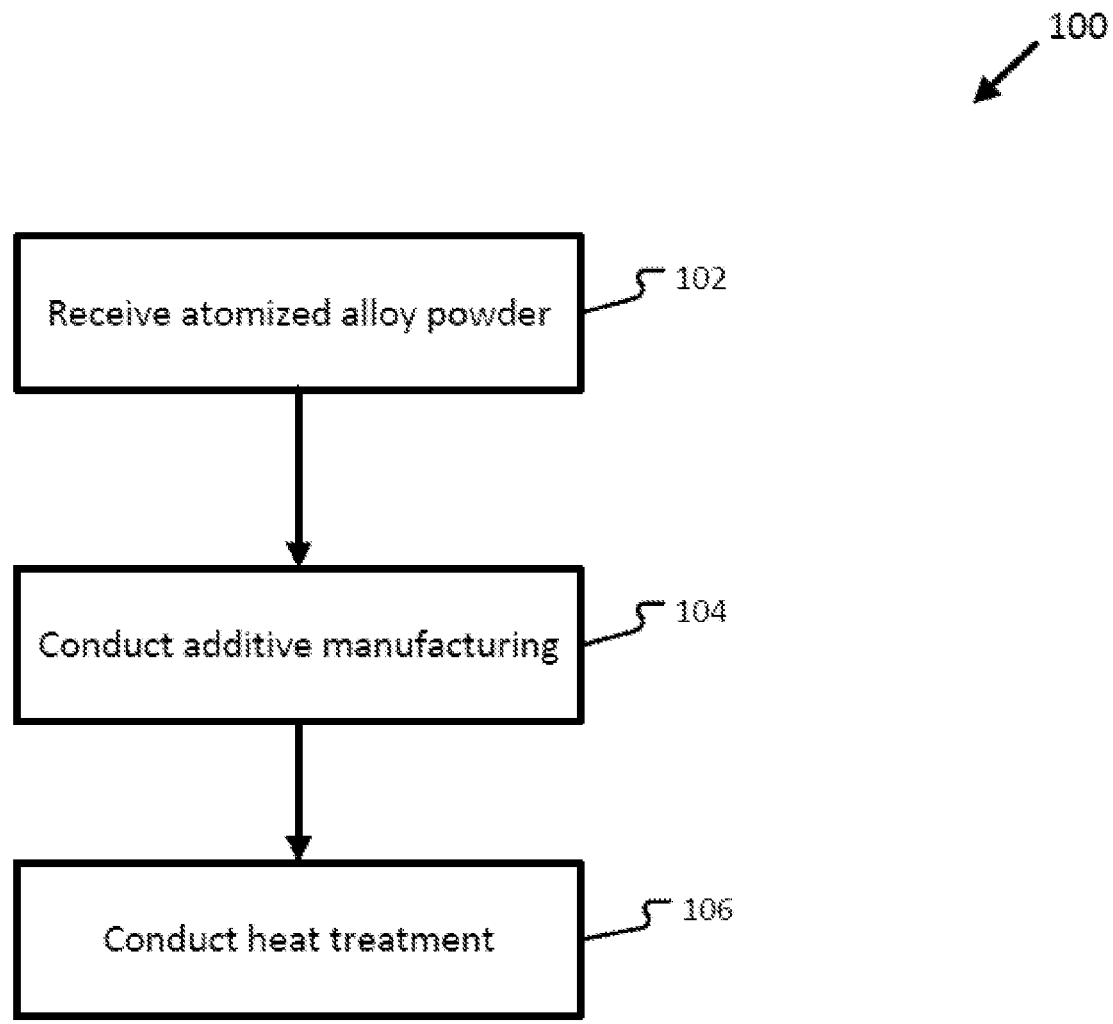
FIG. 1 shows an example method of using an atomized alloy powder in additive manufacturing.

Materials, methods and techniques disclosed and contemplated herein relate to aluminum alloys. Example aluminum alloys include alloys comprising aluminum, magnesium, silicon, and, in some instances, iron and/or manganese. The aluminum alloys can include $Mg_2Si$ phase precipitates.

The aluminum alloys disclosed and contemplated herein are well suited for additive manufacturing applications. For instance, an atomized alloy powder usable in additive manufacturing can include alloy particles comprising aluminum alloys disclosed and contemplated herein.

In some instances, example aluminum alloys disclosed and contemplated herein can display improved processability, strength, and/or corrosion resistance in harsh environments, for instance, when compared to 7000 series aluminum alloys. Example applications of aluminum-based alloys disclosed and contemplated herein include aerospace, automotive, energy industries, as well as other applications where materials can be subjected to extreme temperature and/or loading conditions. Example applications of aluminum alloys disclosed and contemplated herein also include those requiring materials that have high strength and are corrosion resistant. Various manufactured articles can be prepared using the aluminum alloys disclosed herein, including for the aforementioned industries and the aforementioned applications.

I. Example Aluminum Alloys

Example aluminum alloys can have a combination of hot tear resistance and strength, making them amenable to additive manufacturing for production of articles requiring high strength (e.g., aircraft components). Example aluminum alloys are described below regarding example components and amounts, phase and nanostructure characteristics, physical properties, methods of manufacture, exemplary articles of manufacture, and exemplary methods of use.

A. Example Components and Amounts

Aluminum alloys disclosed and contemplated herein include various components at various amounts. For instance, example aluminum alloys include magnesium, silicon, manganese, and iron. Generally, as used herein, "aluminum alloys" mean alloys including aluminum, magnesium, and silicon. The aluminum alloys may further include manganese, and iron.

Example aluminum alloys disclosed and contemplated herein include magnesium (Mg). In various implementations, aluminum alloys include 5-8 weight percent ("wt %") Mg. For example, the aluminum alloys may include 5%, 5.1%, 5.2%, 5.3%, 5.4%, 5.5%, 5.6%, 5.7%, 5.8%, 5.9%, 6%, 6.1%, 6.2%, 6.3%, 6.4%, 6.5%, 6.6%, 6.7%, 6.8%, 6.9%, 7%, 7.1%, 7.2%, 7.3%, 7.4%, 7.5%, 7.6%, 7.7%, 7.8%, 7.9%, or 8% Mg.

Example aluminum alloys disclosed and contemplated herein include silicon (Si). In various implementations, aluminum alloys include 1.5-4 weight percent ("wt %") Si. For example, the aluminum alloys may include 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, or 4% Si.

Example aluminum alloys disclosed and contemplated herein include manganese (Mn). In various implementations, aluminum alloys include no more than 0.3% weight percent ("wt %") Mn. For example, the aluminum alloys may include 0.3%, less than 0.3%, less than 0.25%, less than 0.2%, less than 0.15%, less than 0.1%, less than 0.05%, or less than 0.01% Mn. In some embodiments, example aluminum alloys may not contain Mn.

Example aluminum alloys disclosed and contemplated herein include Iron (Fe). In various implementations, aluminum alloys include no more than 0.2 weight percent ("wt %") Fe. For example, the aluminum alloys may include 0.2%, less than 0.2%, less than 0.15%, less than 0.1%, less than 0.05%, or less than 0.01% Fe. In some embodiments, example aluminum alloys may not contain Fe.

The balance of weight percent comprises aluminum and incidental elements and impurities. Incidental elements and impurities in the disclosed aluminum alloys may include, but are not limited to, iron, oxygen, manganese, chromium, gallium, palladium, sulfur, carbon, elements adhering to raw material stock, or mixtures thereof. Incidental elements and impurities may be present in the alloys disclosed herein in amounts totaling no more than 0.15%, no more than 0.14%, no more than 0.13%, no more than 0.12%, no more than 0.11%, no more than 0.10%, no more than 0.9%, no more than 0.8%, no more than 0.7%, no more than 0.6%, no more than 0.5%, no more than 0.4%, no more than 0.3%, no more than 0.2%, no more than 0.1%, no more than 0.05%, no more than 0.01%, or no more than 0.001%.

It is understood that the multicomponent alloys described herein may consist only of the above-mentioned constituents, may consist essentially of such constituents, or, in other embodiments, may include additional constituents.

B. Example Phase and Nanostructure Characteristics

Aluminum alloys disclosed and contemplated herein have various phase and nanostructure characteristics. For instance, example aluminum alloys can include a stable $Mg_2Si$ eutectic phase. Grain structures within example aluminum alloys can be maintained using a grain pinning dispersion combined with an oxygen gettering phase. These grain structures can aid in maintaining fine grain sizes through building and optional post-build thermal treatments.

Example aluminum alloys can include $Mg_2Si$ phase precipitates in addition to the $Mg_2Si$ eutectic phase.

C. Example Physical Characteristics

Example aluminum alloys disclosed and contemplated herein can have one or more desirable physical properties. For instance, example aluminum alloys may have hot tear resistance during an additive manufacturing process and resulting alloys may have high strength. The following section describes certain physical characteristics of example aluminum alloys, including mechanical properties such as yield strength, ultimate tensile strength, and elongation resistance, as well as corrosion resistance.

Yield strength can be determined by evaluation of data obtained during tensile strength testing. Generally, yield strength relates to a yield point of a material during tensile strength testing; beyond the yield strength point deformations to the material are not recoverable upon removal of the load. Example aluminum alloys, after being subjected to an additive manufacturing process and aging for 120 minutes at 185° C., may have a yield strength of greater than 60 ksi at 22° C. For example, the aluminum alloys may have a yield strength of 60-70 ksi at 22° C. For example, the aluminum alloys may have a yield strength of 60 ksi, 61 ksi, 62 ksi, 63 ksi, 64 ksi, 65 ksi, 66 ksi, 67 ksi, 68 ksi, 69 ksi, or 70 ksi at 22° C. Example aluminum alloys, after subjected to an additive manufacturing process and aging for 120 minutes at 185° C., may have a yield strength of greater than 35 ksi at 200° C. For example, the aluminum alloys may have a yield strength of 35-45 ksi at 200° C. For example, the aluminum alloys may have a yield strength of 35 ksi, 36 ksi, 37 ksi, 38 ksi, 39 ksi, 40 ksi, 41 ksi, 42 ksi, 43 ksi, 44 ksi, or 45 ksi at 200° C.

Generally, ultimate tensile strength is the maximum stress that a material can withstand while experiencing tensile elongation. Tensile strength testing conducted on example aluminum alloys was performed at room temperature in accordance with ASTM E8. Tensile strength testing conducted on example aluminum alloys was performed at elevated temperatures in accordance with ASTM E21. Example aluminum alloys, after being subjected to an additive manufacturing process and after aging for 120 minutes at 185° C., may have an ultimate tensile strength of greater than 70 ksi at 22° C. For example, the aluminum alloys may have an ultimate tensile strength of 70-80 ksi at 22° C. For example, the aluminum alloys may have an ultimate tensile strength of 70 ksi, 71 ksi, 72 ksi, 73 ksi, 74 ksi, 75 ksi, 76 ksi, 77 ksi, 78 ksi, 79 ksi, or 80 ksi at 22° C. Example aluminum alloys, after being subjected to an additive manufacturing process and after aging for 120 minutes at 185° C., have an ultimate tensile strength of greater than 40 ksi at 200° C. For example, aluminum alloys may have an ultimate tensile strength of 40-50 ksi at 200° C. For example, aluminum alloys may have an ultimate tensile strength of 40 ksi, 41 ksi, 42 ksi, 43 ksi, 44 ksi, 45 ksi, 46 ksi, 47 ksi, 48 ksi, 49 ksi, or 50 ksi at 200° C.

Percent elongation may be used as an indication of strengthen alloy's ductility. Example aluminum alloys, after being subjected to an additive manufacturing process and after aging for 120 minutes at 185° C., may have an elongation of at least about 4.5% at 22° C. For example, aluminum alloys may have an elongation of 4.5%, 5%, 5.5%, 6%, 6.5%, 7%, 7.5%, 8%, 8.5%, 9%, 9.5%, or 10% at 22° C. Example aluminum alloys, after being subjected to an additive manufacturing process and after aging for 120 minutes at 185° C., may have an elongation of at least about 4.5% at 200° C. For example, aluminum alloys may have an elongation of 4.5%, 5%, 5.5%, 6%, 6.5%, 7%, 7.5%, 8%, 8.5%, 9%, 9.5%, or 10% at 200° C.

Generally, corrosion resistance refers to how well a substance can withstand damage caused by oxidization or other chemical reactions. Corrosion resistance tests were performed on example aluminum alloys in accordance with ASTM G34. Example aluminum alloys, after being subjected to an additive manufacturing process and after aging for 60 minutes at 200° C., may have improved corrosion resistance as compared to aluminum alloy 7050 in its T74511 temper condition when subjected to a 24 hour test according to ASTM G34.

D. Example Methods of Manufacture

Example aluminum alloys disclosed and contemplated herein can be fabricated into various input stock forms relevant to the additive manufacturing system of interest. For instance, example aluminum alloys disclosed and contemplated herein can be manufactured into atomized alloy powder using available atomization techniques such as inert gas atomization. Resulting atomized alloy powders can be used in powder-bed fusion and directed energy deposition systems.

An example method of manufacturing an atomized alloy powder includes melting elemental metal feedstock or pre-alloyed feedstock such that a desired chemistry is produced. In some combinations of elements disclosed above, when a melt reaches temperatures at or above where no solid material fraction in the melt, atomization processes should take place.

Typically, the melt is a homogenous distribution of the feedstock elements. Example components in the feedstock are described herein, and include, for instance, magnesium, silicon, manganese, iron, and aluminum, in amounts disclosed and contemplated herein. Additional components in the feedstock are contemplated, such as incidental elements and impurities.

Then the melt is passed through a nozzle and immediately exposed to high velocity inert gas, such as argon. The high velocity inert gas breaks up the molten stream and produces spherical powders. The spherical powders then cool and fall into an atomizing tower. This example method can produce spherical powder with desirable flow characteristics and high chemical purity.

Example atomized alloy powders can have particles sized for a particular use and/or fabrication system. In some implementations, example atomized alloy powders include particles having diameters of from 20 μm to 63 μm.

Example aluminum alloys disclosed and contemplated herein can also be fabricated into wire form via conventional ingot metallurgy and wire drawing techniques for use in wire-based additive manufacturing systems.

E. Example Methods of Additive Manufacturing

Example aluminum alloys disclosed and contemplated herein can be used in additive manufacturing systems. Additive manufacturing is a process by which parts are built in a layered fashion by selectively fusing metal using a computer-controlled energy source (e.g., laser, electron beam, weld torch, or the like). Additive manufacturing is also defined in ASTM F2792-12a entitled "Standard Terminology for Additively Manufacturing Technologies."

Example additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. Suitable additive manufacturing systems include the EOSINT M 280 Direct Metal Laser Sintering (DMLS) additive manufacturing system, available from EOS GmbH (Robert-Stirling-Ring 1, 82152 Krailling/Munich, Germany).

In some implementations, direct metal laser sintering (DMLS) is used to produce articles comprising the disclosed and contemplated example aluminum alloys. During example processes, an atomized alloy powder may be spread in a bed and a laser is used to selectively melt and fuse regions of the bed. Articles of manufacture can be built in a layer-by-layer fashion by continually spreading and fusing layers of powder.

In implementations utilizing DMLS, laser settings can be selected to, for a manufactured article, minimize porosity, maximize elongation and reduction in area (RA %), and provide proper strength characteristics. Example DMLS laser parameters in one possible implementation include: laser power of 370 W, scan speed of 1040 mm/s, scan spacing 0.17 mm, and layer depth 30 μm.

Various post-processing operations can be performed after the build process. In some instances, post-processing operations improve one or more characteristics of the "as-built" article of manufacture. In some instances, following the build process, certain articles may contain defects that preclude use "as-built." For example, certain articles may include unacceptable porosity, chemical inhomogeneity, or anisotropy. Post-processing operations can eliminate or minimize such defects.

Post-processing operations can include various heat treatments. The manufactured article can be directly transferred from the additive manufacturing system to a heated enclosure, such as a furnace, without first requiring solutionizing (also referred to as solution heat treating) the article. These heat treatments applied to the manufactured article are referred to herein as "aging" processes. In some implementations of a heat treatment, the heated enclosure may be pressurized to perform hot isostatic pressing of the material to reduce porosity.

Post-processing thermal treatment may relieve stress and/or strengthen one or more portions of the aluminum alloy article. For example, thermal treatments may result in precipitation hardening of one or more portions of the aluminum alloy part. Aging can include placing an as-built article in a heated environment at a temperature for a given period of time. In some instances, aging can be conducted at two distinct temperatures for two distinct times.

Post processing heat treatment can occur at any suitable temperature. As a non-limiting example, post processing heat treatment can occur at a temperature of from 175 to 225° C. In some implementations, heat treatment can occur at a temperature between 185° C.-200° C. In some implementations, heat treatment may have a duration of 0.5-4 hours. In some implementations, heat treatment may have a duration of 1-2 hours.

FIG. 1 shows an example method 100 of using an atomized alloy powder in additive manufacturing. Example method 100 begins by receiving an atomized alloy powder (operation 102). The atomized alloy powder can be example atomized alloy powders disclosed and contemplated herein. In some implementations, the atomized alloy powder includes alloy particles comprising, by weight percentage: 5% to 8% magnesium, 1.5% to 4% silicon, no more than 0.3% manganese, no more than 0.2% iron, and the balance of weight percent comprising aluminum and incidental elements and impurities.

Next, additive manufacturing is conducted (operation 104) with the atomized alloy powder. Conducting additive manufacturing (operation 104) includes operating an additive manufacturing system in such a way as to produce a desired manufactured article. Example apparatus and laser parameters are discussed above, although different apparatus and modifications to those parameters are contemplated and within the scope of this disclosure. Aluminum alloys in the manufactured article can solidify with about 10% of non-equilibrium (soluble) eutectic constituents for improved resistance to hot tearing during additive manufacturing.

After conducting additive manufacturing (operation 104), heat treatment (operation 106) is conducted. Heat treatment (operation 106) can include post-processing aging operations as disclosed and contemplated herein. Generally, heat treatment (operation 106) includes positioning the manufactured article in a heated container, such as a furnace, for a predetermined period of time at one or more temperatures. This process is also referred to herein as an aging process. During heat treatment (operation 106), eutectic constituents can be dissolved to restore a single-phase aluminum matrix, which can be free of coarse eutectic constituents that provided hot tearing resistance.

Upon completion of heat treatment, the manufactured article is removed from the heated container and cooled. Cooling can include positioning the manufactured article in an uncirculated air environment at room temperature.

F. Example Articles of Manufacture

The disclosed aluminum alloys can be used to manufacture a variety of articles. Exemplary articles include, but are not limited to, gearbox housings (e.g., helicopter gearbox housing) and aerospace structural components.

II. Experimental Examples

Experimental examples of aluminum alloys disclosed and contemplated herein were made and tested. In some instances, experimental examples of atomized alloy powders were made and used in additive manufacturing processes. Articles produced using the atomized alloy powders in additive manufacturing were, in some instances, compared with existing commercial alloys.

A. Experimental Example of Yield Strength Determination

Figure 2:
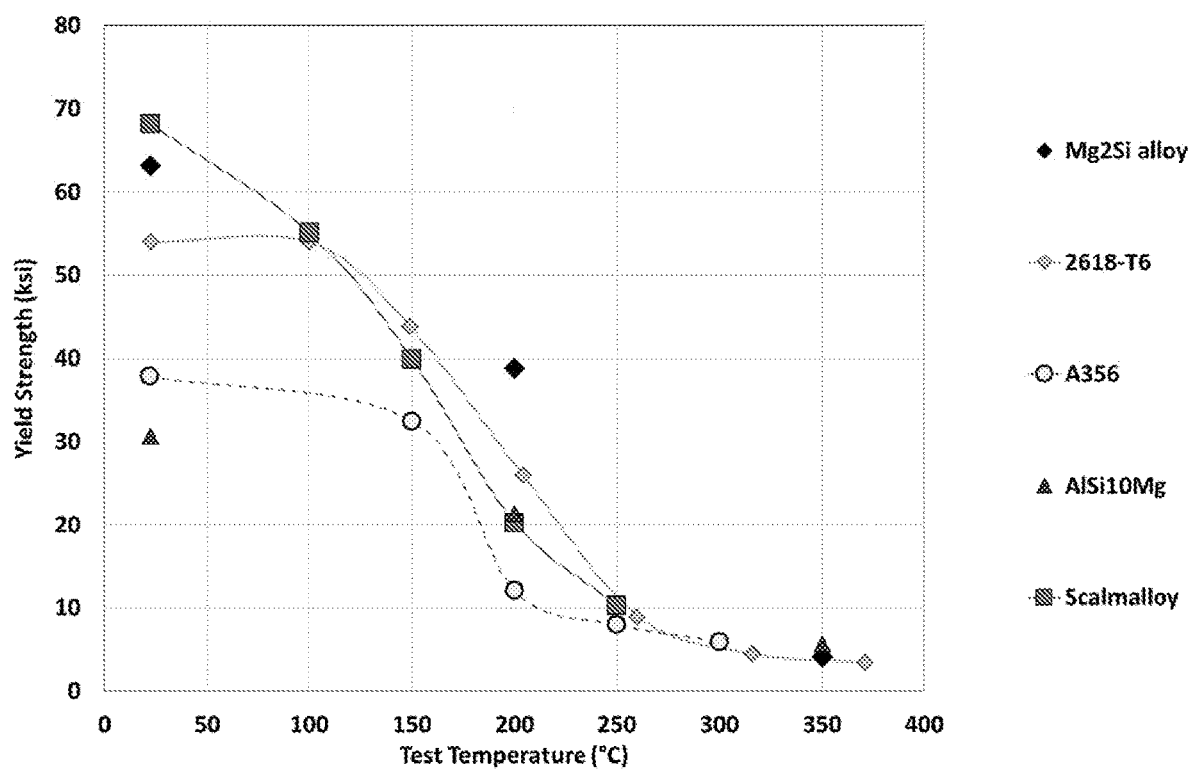
FIG. 2 is a graph showing yield strength plotted as a function of test temperature for an exemplary multicomponent aluminum alloy ($Mg_2Si$). 2618-T6 is a wrought alloy, A356 is a casting alloy, AlSi10Mg is a conventional additive manufacturing alloy, and Scalmalloy is an additive manufacturing alloy with Scandium.

Various heat treatments were evaluated and mechanically tested in tension at various test temperatures. This data is presented in FIG. 2, where the yield strength is plotted as a function of test temperature. It was observed that, when compared to existing data for other alloys that the QuesTek $Mg_2Si$ (Sc-free) alloys perform nominally as well as a scandium-containing alloy. As the test temperature increased, the $Mg_2Si$ alloy outperforms all other plotted alloys at a test temperature of 200° C., where strength levels significantly decrease.

B. Experimental Example of Ultimate Tensile Strength Determination

Figure 3:
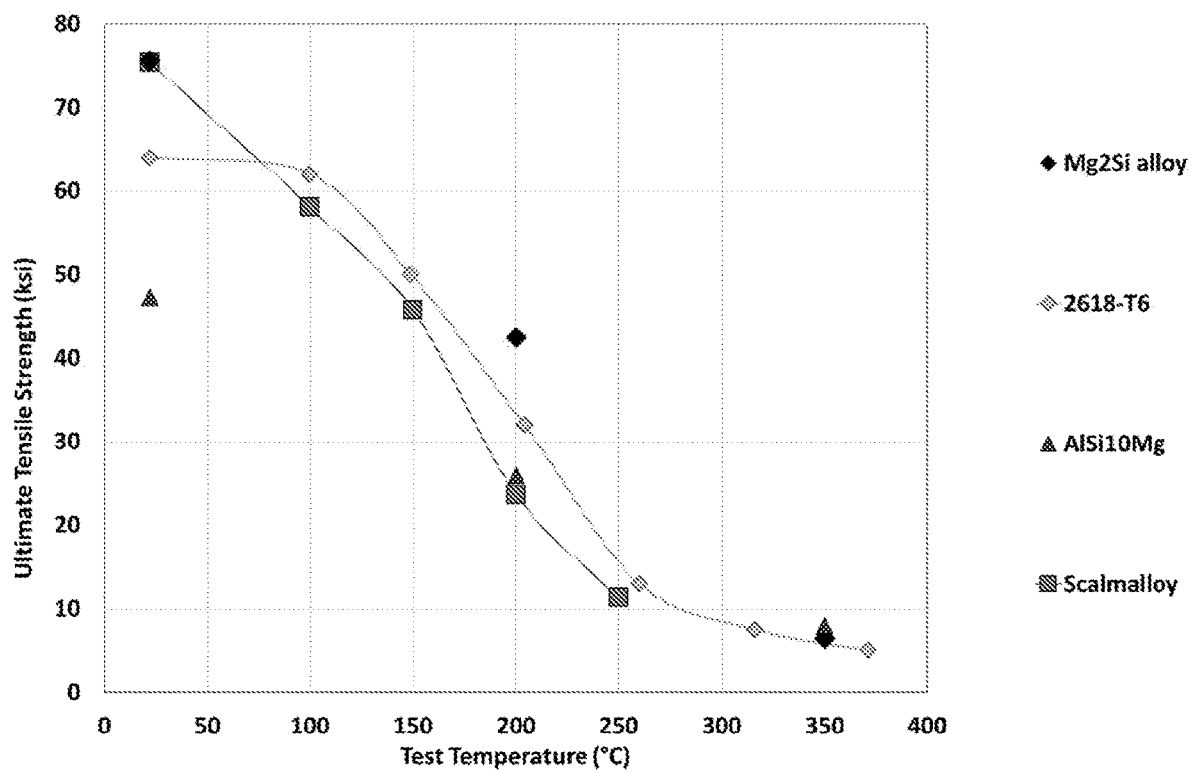
FIG. 3 is a graph showing ultimate tensile strength as a function of test temperature for an exemplary multicomponent aluminum alloy ($Mg_2Si$).

Various heat treatments were evaluated and mechanically tested in ultimate tensile strength at various test temperatures. Tensile strength testing conducted on example aluminum alloys was performed at room temperature in accordance with ASTM E8. Tensile strength testing conducted on example aluminum alloys was performed at elevated temperatures in accordance with ASTM E21. This data is presented in FIG. 3, where the ultimate tensile strength is plotted as a function of test temperature. As the test temperature increased, the $Mg_2Si$ alloy outperforms all other plotted alloys at a test temperature of 200° C., where ultimate tensile strength levels significantly decrease.

C. Experimental Example of Elongation Determination

Figure 4:
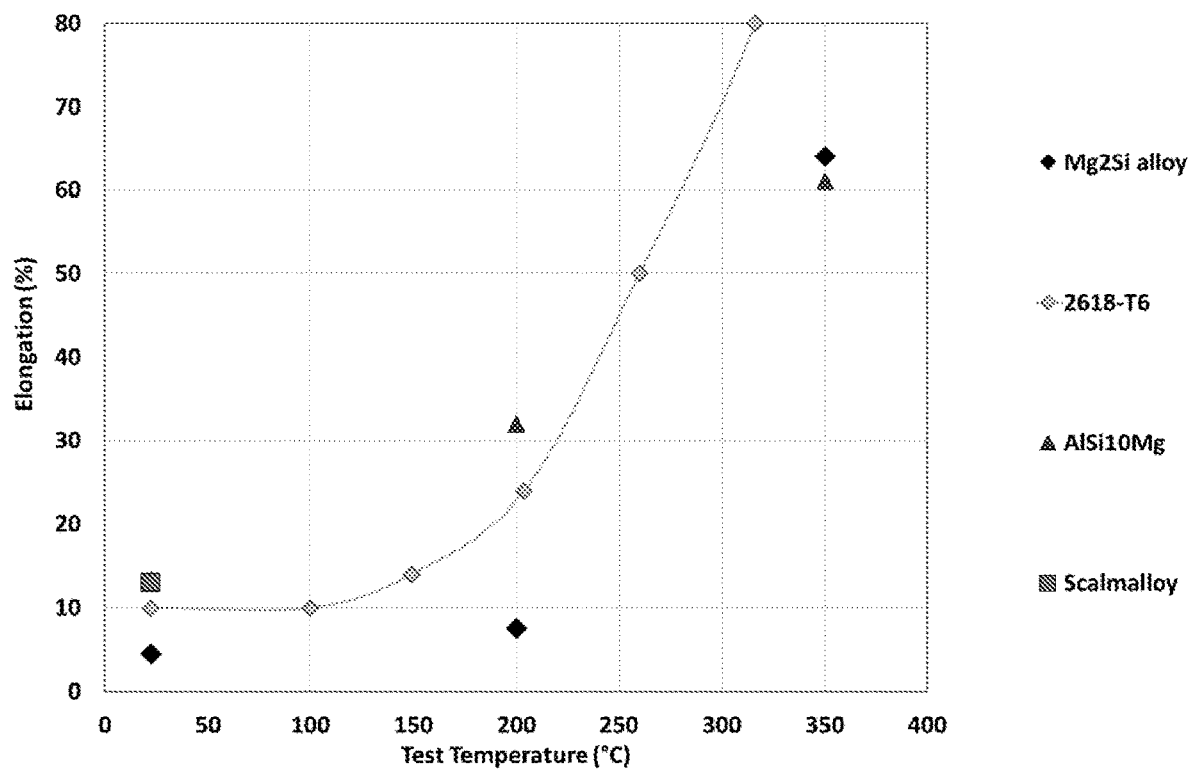
FIG. 4 is a graph showing elongation as a function of test temperature for an exemplary multicomponent aluminum alloy ($Mg_2Si$).

Various heat treatments were evaluated and mechanically tested in elongation at various test temperatures. This data is presented in FIG. 4, where the percent elongation is plotted as a function of test temperature.

D. Experimental Example of Corrosion Resistance Determination

Figure 5A:
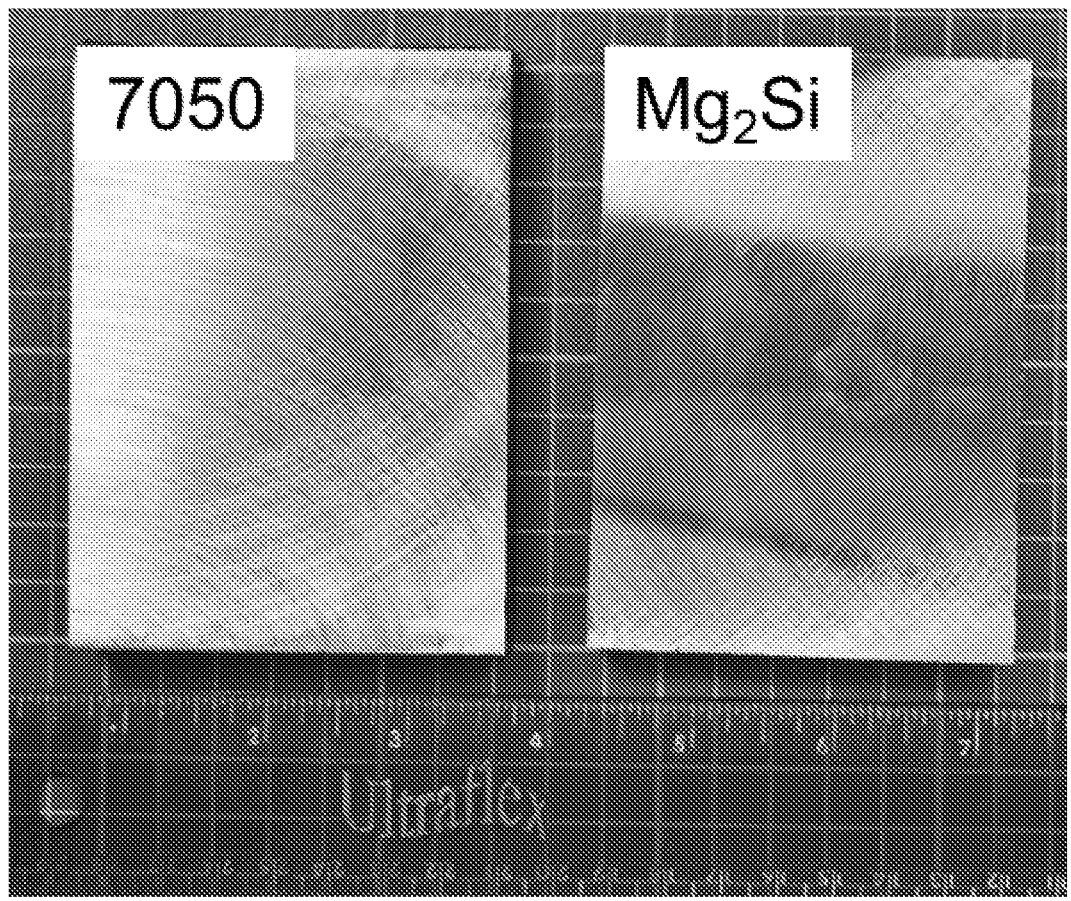
FIG. 5A and FIG. 5B show images of a 7050 baseline alloy and an example MgSi alloy disclosed herein before testing (5A). And after 24 hours (5B). Alloys were evaluated in accordance with ASTM G34 procedures in an exfoliation corrosion (Exco) test. The disclosed alloy demonstrates improved resistance over 7050.
Figure 5B:
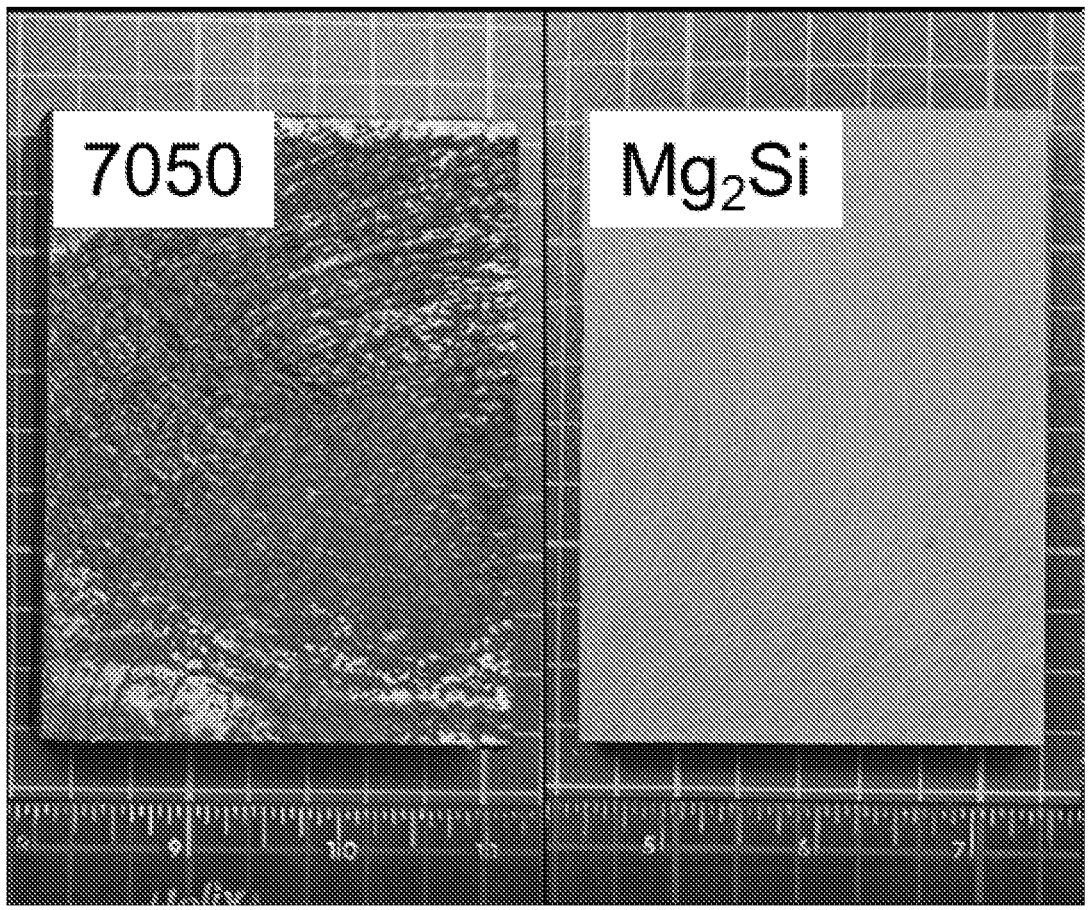

Corrosion resistance was evaluated in accordance with ASTM G34 procedures. As shown in FIG. 5, the multicomponent aluminum alloy has improved corrosion resistance as compared to aluminum alloy 7050 in its T74511 temper condition when subjected to a 24 hour test according to ASTM G34.

For the recitation of numeric ranges herein, each intervening number there between with the same degree of precision is contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are contemplated. For another example, when a pressure range is described as being between ambient pressure and another pressure, a pressure that is ambient pressure is expressly contemplated.

It is understood that the foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. A method of using an atomized alloy powder in additive manufacturing, the method comprising:

receiving the atomized alloy powder comprising alloyed particles, the alloyed particles comprising, by weight percentage:
5% to 6% magnesium;
3.5% to 4% silicon;
no more than 0.3% manganese;
no more than 0.2% iron; and
the balance of weight percent comprising aluminum and incidental elements and impurities,
wherein the atomized alloy powder includes $Mg_2Si$ phase precipitates;
performing additive manufacturing to generate a manufactured article; and
positioning the manufactured article in a heated container for a predetermined period of time,
wherein a temperature within the heated container is 170-200° C.; and
wherein the predetermined period of time is 60-120 minutes; and
removing the manufactured article from the heated container and cooling in air to room temperature.

2. The method according to claim 1, wherein the manufactured article has a yield strength of greater than 60 ksi at 22° C.; and
wherein the manufactured article has a yield strength at least 35 ksi at 200° C.

3. The method according to claim 2, wherein the manufactured article has an ultimate tensile strength of greater than 70 ksi at 22° C.;
wherein the manufactured article has an ultimate tensile strength of greater than 40 ksi at 200° C.; and
wherein the manufactured article has an elongation of at least 4.5% at 200° C.

4. A method of using an atomized alloy powder in additive manufacturing, the method comprising:
receiving the atomized alloy powder comprising alloyed particles, the alloyed particles comprising, by weight percentage:
5-7.5% magnesium and 3.5-4% silicon, 5-6% magnesium and 3-4% silicon, or 5% magnesium and 2-4% silicon;
no more than 0.3% manganese;
no more than 0.2% iron; and
the balance of weight percent comprising aluminum and incidental elements and impurities,
wherein the atomized alloy powder includes $Mg_2Si$ phase precipitates;
performing additive manufacturing to generate a manufactured article; and
positioning the manufactured article in a heated container for a predetermined period of time,
wherein a temperature within the heated container is 180-185° C.; and
wherein the predetermined period of time is 90 minutes; and
removing the manufactured article from the heated container and cooling in air to room temperature.

5. The method according to claim 4, wherein the manufactured article has a yield strength of greater than 60 ksi at 22° C.

* * * * *